No. 629,941. Patented Aug. 1, 1899.
L. WANNER, Jr.
MUD CATCHER FOR FILTERS.
(Application filed Sept. 6, 1898.)
(No Model.) 3 Sheets—Sheet 1.

WITNESSES:
INVENTOR
ATTORNEY

No. 629,941. Patented Aug. 1, 1899.
L. WANNER, JR.
MUD CATCHER FOR FILTERS.
(Application filed Sept. 6, 1898.)

(No Model.) 3 Sheets—Sheet 2.

WITNESSES: INVENTOR
Louis Wanner, Jr.
by R. Godeffroy
ATTORNEY

No. 629,941. Patented Aug. 1, 1899.
L. WANNER, Jr.
MUD CATCHER FOR FILTERS.
(Application filed Sept. 6, 1898.)
(No Model.) 3 Sheets—Sheet 3.
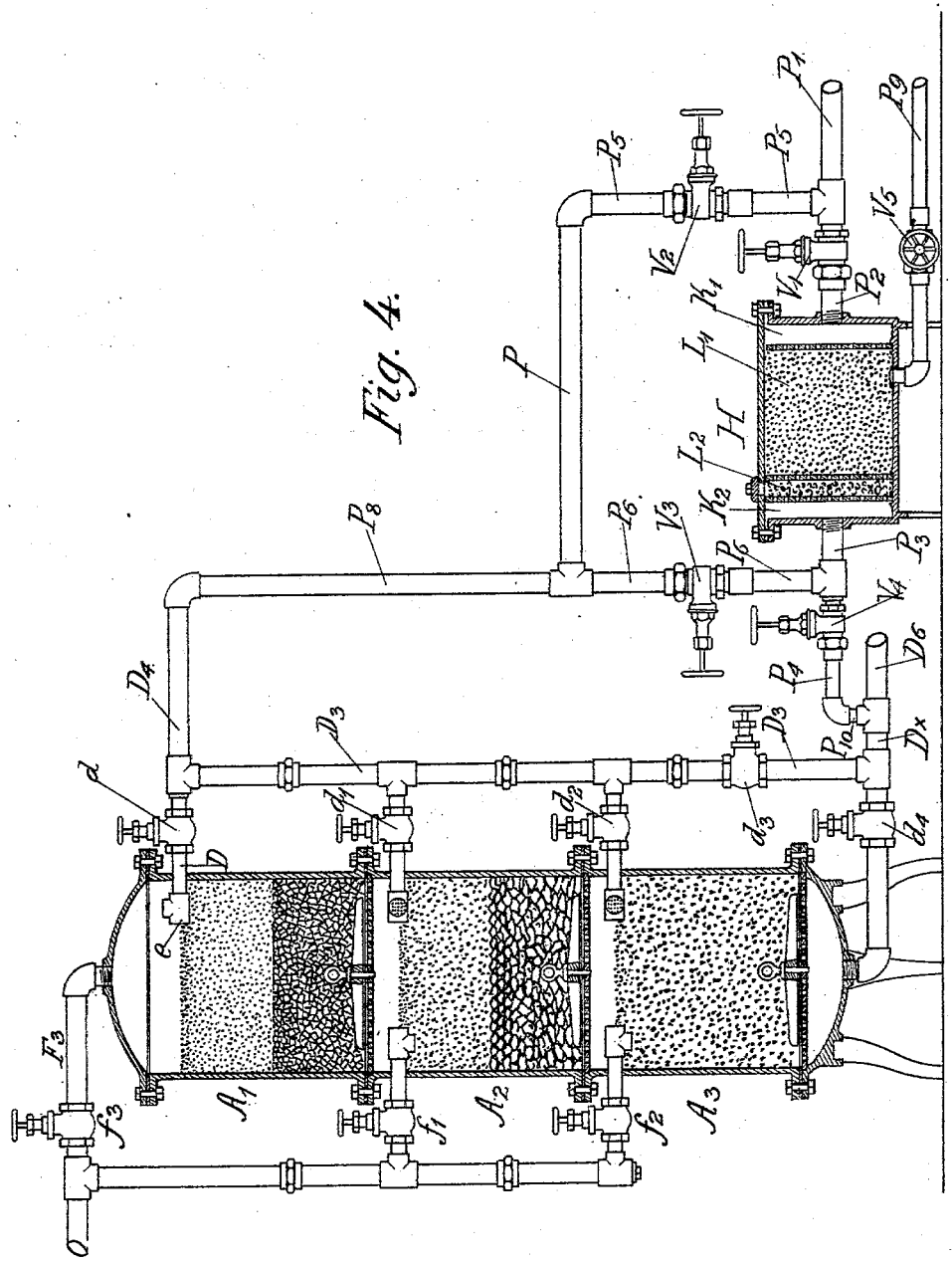
WITNESSES:
INVENTOR
Louis Wanner, Jr
by R. Godeffroy
ATTORNEY.

UNITED STATES PATENT OFFICE.

LOUIS WANNER, JR., OF PHILADELPHIA, PENNSYLVANIA.

MUD-CATCHER FOR FILTERS.

SPECIFICATION forming part of Letters Patent No. 629,941, dated August 1, 1899.

Application filed September 6, 1898. Serial No. 690,333. (No model.)

*To all whom it may concern:*

Be it known that I, LOUIS WANNER, Jr., a citizen of the United States, residing at Philadelphia, in the county of Philadelphia and State of Pennsylvania, have invented certain new and useful Improvements in Mud-Catchers for Filters, of which the following is a specification, reference being had therein to the accompanying drawings.

The object of my invention is to construct a mud-catcher to be used in connection with the filter patented September 28, 1897, No. 590,868, for the purpose of separating the mud and other heavy inorganic matter from the water before it enters the filter proper. Experience having shown that mud and other heavy inorganic matter contained in the water clogs up the holes in the upper perforated plate of the filter and of the wire-gauze on the same, that this mud and other matter gets only partly removed when the filter is being cleansed, as shown in the patent drawings for this filter, and that, further, in spite of the upward pressure and motion of the water during the process of cleansing the filter a part of the mud and other similar matter will settle down and into the filling of the upper section of the filter, I have found it advisable to omit the upper perforated plate with wire-gauze and spider on the upper section of the said filter as being detrimental to the perfect working of the same and to replace this part of the filter with a separate mud-catcher.

A further object of the invention of a separate mud-catcher relates to the peculiar construction which allows it to be cleaned separately without interfering with the working of the filter during this time.

Figure 1:
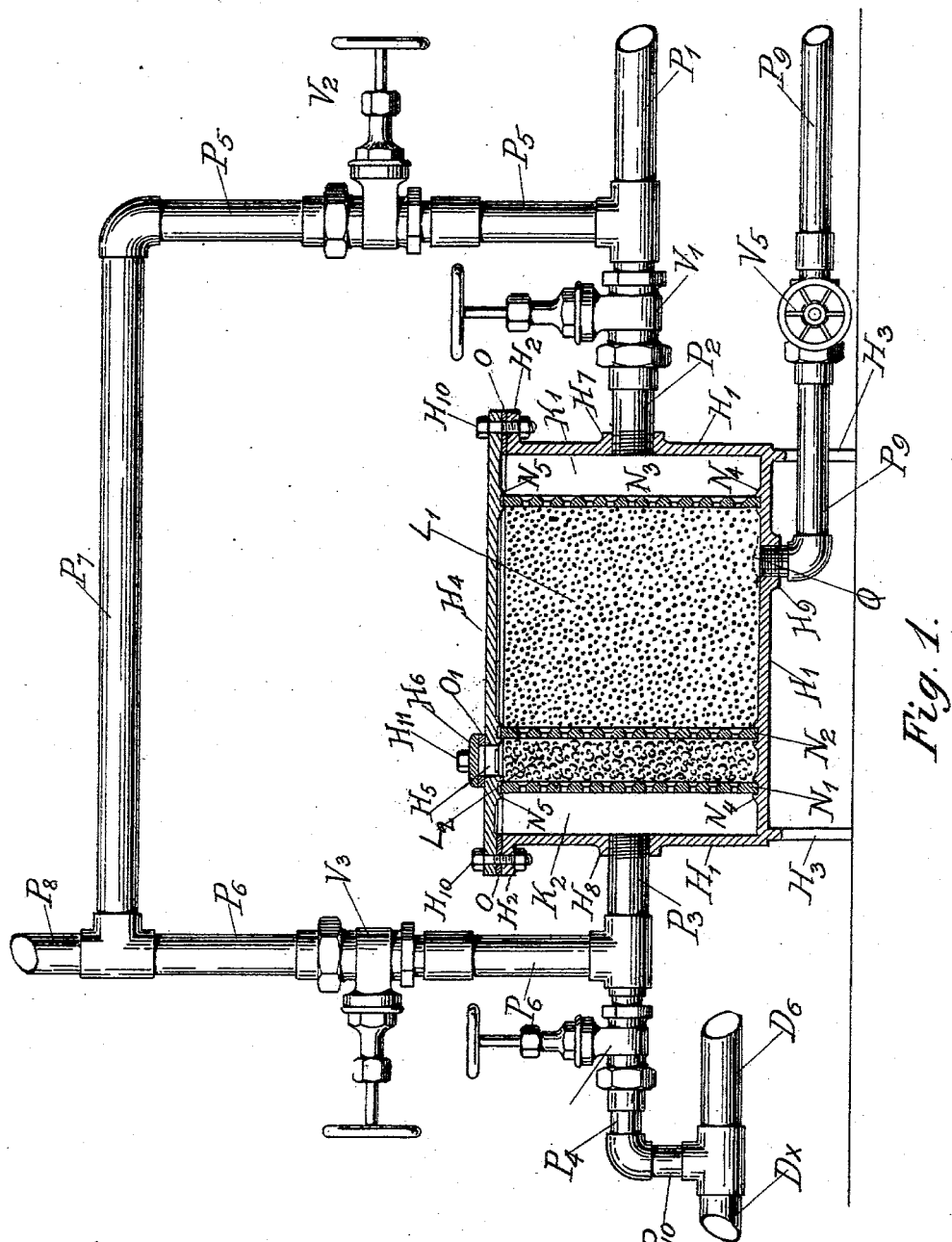
Figure 2:
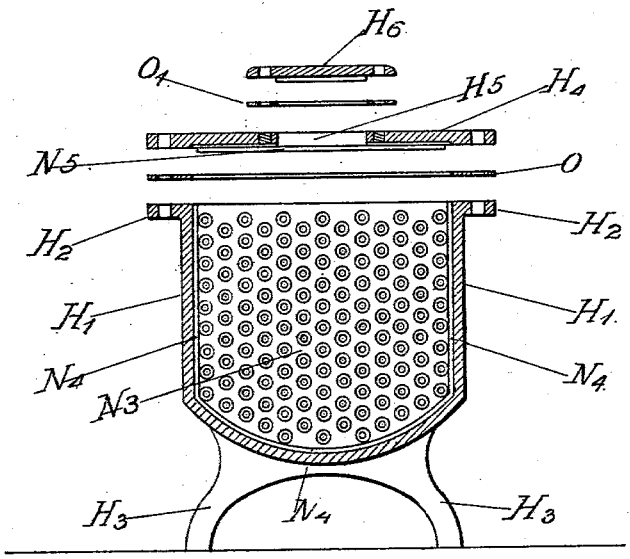
Figure 3:
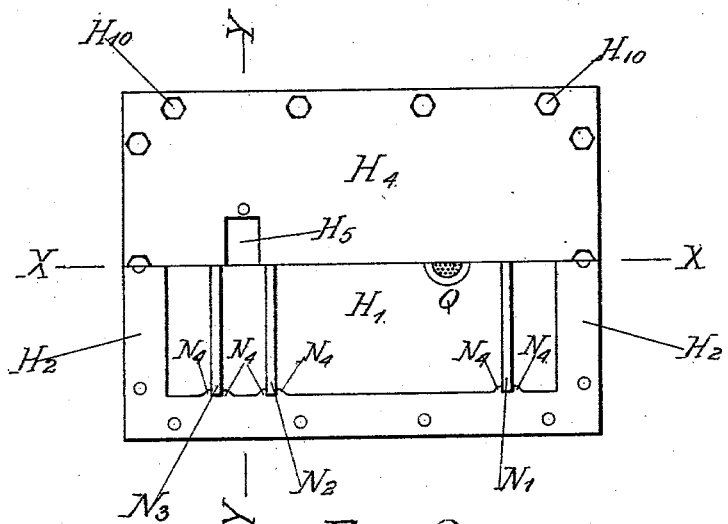

In the accompanying drawings, Figure 1, Sheet 1, is a vertical sectional view of the mud-catcher proper on line X X of Fig. 3, Sheet 2, and the piping and valves belonging to the same. Fig. 2, Sheet 2, is a transverse section on line Y Y of Fig. 3, the lid $H^4$, hand-hole cover $H^6$, and the gaskets O and O' shown elevated above the body. Fig. 3 is a top view of the mud-catcher proper, the lower half with the lid removed. Fig. 4, Sheet 3, is a vertical sectional view of the mud-catcher and filter combined.

H, Sheet 3, is the mud-catcher, consisting of the body H', Sheets 1 and 2, in the present instance made of cast-iron in one piece with the flanges $H^2$ and the feet $H^3$, the lid $H^4$ with the hand-hole $H^5$ and the hand-hole cover $H^6$, the perforated partition-plates $N'$ $N^2$ $N^3$, the reinforcements $H^7$ $H^8$ $H^9$ for the inlet, the outlet, and the clean-out pipe. In the present instance the lid, hand-hole cover, and the perforated partition-plates are all made of cast-iron.

$N^4$ are lugs or ribs cast in one piece with the body H and have the purpose of holding the perforated partition-plates $N'$ $N^2$ $N^3$ in place. The latter are removable from the body of the mud-catcher, being cast separately.

$N^5$ are lugs or ribs on the under side of the lid $H^4$ and help to keep the perforated partition-plates $N'$ $N^2$ $N^3$ in place.

O and O' are washers or gaskets made of rubber, leather, lead, or some other suitable material. O is inserted between the flanges $H^2$ of the body and the lid $H^4$, the latter being fastened down by means of the bolts and nuts $H^{10}$. O' is inserted between the lid $H^4$ and the hand-hole cover $H^6$, the latter being fastened down by means of the tap-screws $H^{11}$.

The holes in the perforated partition-plates $N'$ $N^2$ $N^3$ are countersunk or funnel-shaped on one side, the funnel-shaped side showing toward the inlet-chamber $K'$.

$K'$ and $K^2$ are the water chambers or reservoirs.

The spaces $L'$ and $L^2$ are filled with filtering material capable of separating the mud and other heavy inorganic matter from the water when it passes through the same under pressure. In the present instance $L'$ is filled with slag-grits and $L^2$ with sponges well pressed into the space $L^2$. In Figs. 2 and 3, Sheet 2, the filling of the chambers $L'$ and $L^2$ is omitted for the purpose of better illustrating the construction of the mud-catcher.

$P'$ and $P^2$ are sections of the inlet-pipe with inlet-valve $V'$.

$P^5$ and $P^7$ are the by-pass pipes with by-pass valve $V^2$.

$P^3$ $P^6$ $P^8$ are the supply-pipes to the filter with the supply-valve $V^3$.

$P^{10}$ $P^4$ $P^3$ are the return-pipes from the filter with return-valve $V^4$.

$P^9$ is the clean-out pipe with clean-out valve $V^5$ and strainer Q.

$D^6$ is the house supply-pipe from the filter to the house.

All pipes are of standard dimensions, their diameter depending upon the size of the mud-catcher and filter. The connections are of standard patterns, consisting of elbows and T's. The valves in the present instance are gate-valves; but it is obvious that any well-constructed kind of valve may be used for the purpose.

Similar letters refer to similar parts throughout the several views, and the letters referring to the filter proper are the same as on the patent drawings for the said filter patented September 28, 1897.

The working of the filter proper being fully explained in the specification for the same and illustrated by the diagram Sheet 3 of the Patent No. 590,868, dated September 28, 1897, I confine myself here to the explanation of the working of the mud-catcher in connection with the filter.

The appliance of the mud-catcher is as follows: As the filter and mud-catcher can only be used when the water-supply has a sufficient pressure, be it from a city water-supply, from elevated tank, or otherwise, it is well understood that the water must enter the inlet-pipe under pressure, and the explanation of the working of the mud-catcher and filter are based upon this assumption.

(A) When the valves $V'$ and $V^3$ are open and the valves $V^2$ $V^4$ $V^5$ closed, the water will pass through the inlet-pipes $P'$ $P^2$ into the inlet-chamber $K'$. In this inlet-chamber $K'$ the body of water assumes the total area of the transverse section of the mud-catcher and will be driven through the perforated plates $N^3$ $N^2$ $N'$ and the fillings in $L'$ and $L^2$ with the same pressure per square inch as it entered the inlet-pipe $P'$, the supply-pipe $P^3$ having the same section as $P'$. The fillings of the chamber $L'$ and $L^2$ will retain the mud and other heavy inorganic substances from the water, and it will pass into the supply-chamber $K^2$ in a partly-filtered condition. From the supply-chamber $K^2$ the water will pass through the supply-pipes $P^3$ $P^6$ $P^8$ into the supply-pipe of the filter, thus allowing the use of the filter as shown on the diagram Sheet 3 in all figures.

(B) When the valve $V^2$ is open and the valves $V'$ $V^3$ $V^4$ $V^5$ are closed, the water will not enter the mud-catcher, but will pass from the inlet-pipe $P'$ through the by-pass pipes $P^5$ $P^7$ into the supply-pipe $P^8$ and the filter-supply pipe, thus allowing the use of the filter as shown on the diagram Sheet 3 in all figures.

(C) When the valves $V^2$ $V^4$ $V^5$ are open and the valves $V'$ $V^3$ closed, the water will pass through the by-pass pipes $P^5$ $P^7$ into the supply-pipe $P^8$ and the filter-supply pipe, allowing the use of the filter as shown on the diagram Sheet 3 in Fig. 12 of the patent drawings for the filter. The water will pass through the valve in the bottom outlet-pipe of the filter into $D^\times$, and as the pipe $D^6$ is shut off through the spigots in the house it must pass through the pipes $P^4$ $P^3$ into the mud-catcher, will wash the same out with filtered water, and carry all the mud and other heavy inorganic substances which were contained in the water through the clean-out pipes $P^9$.

(D) When the valves $V'$ $V^4$ are open and the valves $V^2$ $V^3$ $V^5$ closed, the water will enter and pass through the mud-catcher, as shown above under A, but will pass through the pipes $P^3$ $P^4$ into the part $D^\times$ of pipe $D^6$, thus allowing the use of the filter as shown on the diagram Sheet 3 of the patent drawings for the filter in all figures except Fig. 12.

(E) When the valves $V^2$ $V^3$ $V^5$ are open and the valves $V^4$ $V^5$ $d$ $d^3$ $d^4$ closed, the water will pass from the inlet-pipe $P'$ through the by-pass and supply pipes $P^5$ $P^7$ $P^6$ $P^3$ into the mud-catcher, will wash the same out with unfiltered water, and carry the mud and other heavy inorganic matter which was contained in the water through the clean-out pipe $P^9$.

As the opening for clean-out pipe $P^9$ is at the bottom of the mud-catcher, it is obvious that all the muddy and other heavy residue of the water can be removed by washing out, which in the filter as constructed and shown in the drawings for the Patent No. 590,868 gradually permeated the filling of the upper section of the same, because of the characteristic of such residue to settle downward, even in a mass of water moving upward, unless the latter should have a great velocity and be unencumbered by any obstacles, such as the upper perforated plate and gauze sheet in the filter.

In the present instance I have specified the filling of the space $L'$ with slag-grits and of $L^2$ with sponge, although there is a number of other suitable materials—as sand, charcoal, bone-black, and others—which may be applied for the same purpose.

Having discovered another filtering material the nature and composition of which I am at present not desirous to divulge nor to have secured by Letters Patent, it may be desirable to use the same as a filling in the mud-catcher. This, as well as the local conditions where the filtering apparatus, consisting of mud-catcher and filter, is to be installed, the pressure and chemical condition of the water to be filtered, as well as the amount of solid matter contained in the same, may necessitate an increase or a decrease in the number of chambers in the mud-catcher, although the construction shown in the drawings and specified hereinabove will be the standard construction.

For filters of large dimensions or for filtering plants consisting of two or more filters, or where a constant supply of thoroughly-filtered water is required, it may be necessary to use a battery of a number of mud-catchers, thus allowing part of the same to be cleansed with thoroughly-filtered water, while the others supply the partly-filtered water to the filter or filters. These batteries may consist of single mud-catchers connected with the supply and clean-out pipes by separate branch pipes and valves, allowing each to be operated singly and independently of the others. Such battery instead of using single mud-catchers may consist of a number of mud-catchers combined in one body separated by common walls or plates, the latter having the provisions for holding the perforated plates on either side. It is further obvious that the shape of the body of the mud-catcher is not essential for the principle of its application and that especially where batteries of such are used the shape of the bodies, whether single or combined in one, may be made high and narrow to save space. The bottom of the mud catcher or catchers, although shown curved in the drawings, may just as well be constructed flat, with proper grade toward the strainer of the clean-out pipe or pipes. Further, although the mud-catcher is designed and intended to be used in connection with a filter or filters, there may be cases—as for industrial purposes, for instance—where it is sufficient to deprive the water merely of the impurities which can be separated from the same by the mud-catcher alone. In such cases it would merely require the use of a mud-catcher or a battery of mud-catchers without any other filter in connection with the same.

What I claim as my invention, and desire to secure by Letters Patent, is the following:

1. The combination in a mud-catcher of a body with lid, hand-hole and hand-hole cover, said body separated into compartments by perforated partition-plates, some of the compartments filled with filtering material, a valved inlet at one end, a valved supply-outlet at the other end, a valved clean-out pipe with strainer at the bottom and a valved by-pass, all substantially as set forth and described.

2. The combination in a mud-catcher for a filter, of a body with lid, hand-hole and hand-hole cover, separated into compartments by perforated partition-plates, some of the compartments filled with filtering material, a valved inlet-pipe at one end, a supply-outlet at the other, connecting with the inlet-pipe of a filter by one valve and with the outlet-pipe of a filter by another valve, a valved clean-out pipe with strainer at the bottom and a valved by-pass, connecting the inlet-pipe directly, with the inlet-pipe of a filter, all substantially as set forth and described.

3. The combination in a mud-catcher of a body closed with a removable lid a hand-hole with removable hand-hole cover, removable perforated partition-plates, kept in place by lugs or ribs projecting from the bottom and sides of the body; and from the under side of the lid, the holes of the perforated partition-plates countersunk or funnel-shaped on one or both sides, the perforated partition-plates dividing the mud-catcher into a number of compartments, the outer or end compartments being water chambers or reservoirs, one connected with the valved inlet-pipe and the other with the valved outlet-pipe, the inner compartments filled with filtering material and one of them connected with a valved clean-out pipe with strainer at the bottom of the mud-catcher, all substantially as set forth and described.

4. The combination in a mud-catcher made up of a body with lid, hand-hole, hand-hole cover, divided into four compartments, by removable perforated partition-plates, the two outer compartments being water-chambers, one provided with a threaded reinforcement for a valved inlet-pipe, the other provided with a threaded reinforcement for a valved outlet-pipe, the water-chambers distributing the water entering the mud-catcher so as to pass through the two inner chambers with an even pressure throughout the whole area of the perforated partition-plates, the larger inner compartment nearer to the inlet water-chamber, filled with slag-grits, the other inner compartment, nearer to the outlet water-chamber filled with sponges, well pressed into this compartment, the hand-hole with cover over the smaller inner compartment filled with sponges, allowing their removal, cleansing and replacing without removing the lid, a threaded reinforcement at the bottom of the mud-catcher in the larger inner chamber, filled with slag-grits, for a valved clean-out pipe and strainer, all substantially as set forth and described.

In testimony whereof I affix my signature in presence of two witnesses.

LOUIS WANNER, JR.

Witnesses:
GEO. H. RAPSON,
W. WALTER HENDERSON.